United States Patent [19]

Schuster et al.

[11] 4,189,444
[45] Feb. 19, 1980

[54] PROCESS FOR THE PREPARATION OF N,N'-DISUBSTITUTED 2-NAPHTHALENEETHANIMIDAMIDE AND INTERMEDIATES USED THEREIN

[75] Inventors: Albert Schuster; James R. McCarthy, both of Indianapolis, Ind.

[73] Assignee: The Dow Chemical Company, Midland, Mich.

[21] Appl. No.: 6,143

[22] Filed: Jan. 24, 1979

Related U.S. Application Data

[62] Division of Ser. No. 921,690, Jul. 3, 1978.

[51] Int. Cl.$^2$ ............................................ C07C 119/18
[52] U.S. Cl. ............................................ 260/453 RW
[58] Field of Search ................................ 260/453 RW

[56] References Cited

U.S. PATENT DOCUMENTS 3,468,939  9/1969  Kaltenbronn ................ 260/453 RW Primary Examiner—Alan L. Rotman
Assistant Examiner—Robert C. Whittenbaugh

[57] ABSTRACT

N,N'-disubstituted 2-naphthaleneethanimidamide is prepared by the conversion of a nitrile into the novel imido ester salt intermediate by alcoholysis followed by treatment of the intermediate with an alkylamine to give the product.

4 Claims, No Drawings

PROCESS FOR THE PREPARATION OF N,N'-DISUBSTITUTED 2-NAPHTHALENEETHANIMIDAMIDE AND INTERMEDIATES USED THEREIN

This is a divisional of application Ser. No. 921,690, filed July 3, 1978.

BACKGROUND OF THE INVENTION

U.S. Pat. No. 3,903,163 describes various N,N'-disubstituted 2-naphthaleneethanimidamide compounds and their pharmaceutically-acceptable salts as displaying central nervous system activity. The compounds are particularly useful as antidepressants and antianxiety agents. The active compounds were prepared by reacting 2-naphthylacetonitrile with a preselected primary amine and primary ammonium ion. Alternately, the compounds were prepared by the reaction of the corresponding substituted naphthylacetamide with a trialkyloxonium fluoroborate to prepare the N-alkyl substituted arylnitrilium fluoroborate salt. This was followed by the reaction of the fluoroborate salt with a primary alkylamine. Neither method of preparing the compounds was satisfactory for the production of large batches of material for commercial purposes.

SUMMARY OF THE INVENTION

The present invention is directed to a process for preparing N,N'-disubstituted 2-naphthaleneethanimidamide compounds and their pharmaceutically-acceptable salts having the general formula

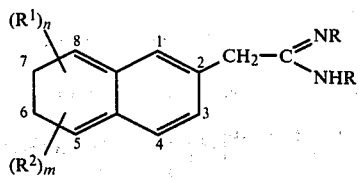

wherein R represents a loweralkyl of from 1 to 3 carbon atoms; $R^1$ and $R^2$ independently represent halo loweralkoxy or loweralkyl; and m and n independently represent the integers zero or one. As used herein the terms loweralkoxy and loweralkyl refer to a moiety having from 1 to about 3 carbon atoms in a chain, either branched or unbranched. The term halo refers to a halogen substitution selected from the group consisting of chloro, bromo, and fluoro. As used herein the term pharmaceutically-acceptable salt refers to an acid addition salt of the free base which is relatively innocuous to animals at dosages consistent with good pharmacodynamic activity so that the side effects ascribable to the anion does not vitiate the beneficial effects of the free base.

In carrying out the method of the present invention a compound corresponding to formula I is prepared in a two step reaction. In the first step the nitrile is converted into the corresponding imido ester salt by alcoholysis using an absolute alcohol and an anhydrous acid. In the second step the imido ester salt is treated with excess anhydrous alkylamine to give the N,N'-disubstituted napohthaleneethanimidamide salt. The general reaction sequence may be represented as follows:

Step 1

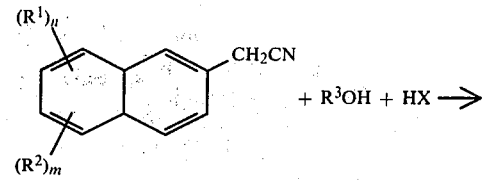

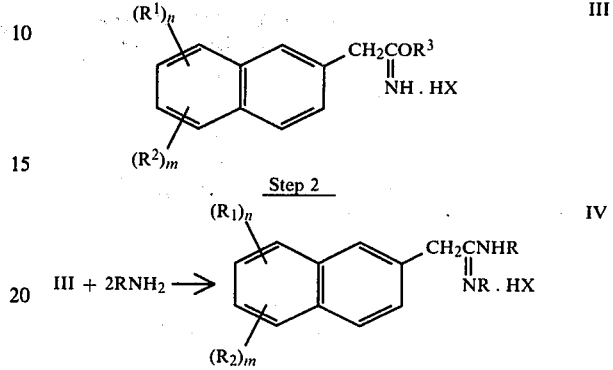

wherein R, $R^1$, $R^2$, n and m are as defined above, $R^3$ is a lower alkyl generally of from one to about 3 carbon atoms and X is a halide.

The N,N'-disubstituted 2-naphthaleneethanimidamide salt (IV) may be separated by conventional procedures such as filtering or centrifugation. The free base may be prepared by the neutralization of the salt in an aqueous base. For example, the salt may be mixed with a molar equivalent amount of sodium hydroxide in aqueous solution, excess aqueous sodium carbonate or the like, after which the free base is separated by extraction with an organic solvent. The salt and free base may also be further purified, if desired, by using conventional procedures such as washing or recrystallization.

The present invention is also directed to the novel alkyl 2-naphthaleneethanimidate salts corresponding to formula III which serve as intermediates in the above reaction sequence. Particularly preferred are compounds corresponding to formula III wherein n and m are both 0 and compounds wherein the substitutions are in the 1-, 3- or 4-position on the naphthalene moiety, of these compounds especially preferred are those bearing a chloro substitution in the 1-position.

DETAILED DESCRIPTION OF THE INVENTION

In carrying out Step 1 of the above reaction a 2-naphthylacetonitrile corresponding to formula II is dissolved in a nonhydrolytic solvent, such as toluene, chloroform, or ether, and treated with an absolute lower alcohol such as methyl alcohol, ethyl alcohol, propyl alcohol, etc. For each equivalent of nitrile from about 1 to about 1.4 equivalents of alcohol are used with about 1.15 equivalents of alcohol being preferred. An anhydrous strong acid, generally a hydrogen halide such as hydrochloric or hydrobromic acid, is added at such a rate that the reaction temperature does not exceed 40° C. The preferred temperature for carrying out Step 1 of the reaction is between 0° and 30° C. At least one equivalent of acid is required for complete reaction and greater quantities may be added up to the saturation point without significantly affecting the reaction. The reaction is allowed to run until substantially all of the nitrile is converted to the imidate, generally about 15 hours. The reaction may be monitored by thin layer chromatography and the disappearance of the starting nitrile is indicative of complete reaction. The imido ester salt (III) usually crystallizes from the reaction mixture and may be collected by filtration. The reaction should not be run above atmospheric pressure since undesirable side reactions may take place which effect the purity of the product.

In Step 2 of the reaction sequence the imido ester salt (III) prepared in step 1 is reacted with a preselected anhydrous alkylamine in an inert solvent such as methanol, ethanol, dimethylfuran, and the like. This step may be carried out in a pressured vessel if desired. The reaction temperature is maintained at from about 45° C. to about 120° C., with from 50° to 80° C. being preferred. The reaction is run for a time sufficient to convert substantially all of the imido ester salt to the final product. Step 2 actually occurs via two consecutive reactions wherein first one equivalent of the alkylamine is consumed by the imido ester salt to form the species

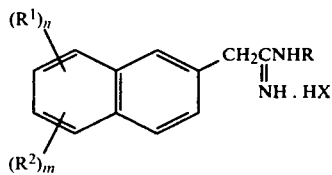

In the second reaction the final product forms slowly from compound V and a second equivalent of the alkylamine. Thus simply following the disappearance of the imidate is not sufficient to indicate the conversion of the intermediate to the final acetamidine. An excess of alkylamine is generally preferred to assure satisfactory yields of product.

The following examples will serve to further clarify the present invention, but are not to be construed as a limitation thereon.

EXAMPLE 1

Preparation of ethyl 2-naphthaleneethanimidate hydrochloride intermediate

The reaction vessel was charged with 40.0 grams (0.239 mol.) of 2-naphthylacetonitrile, 12.7 grams (0.274 mol.) of absolute alcohol, and 400 ml of toluene. The resulting mixture was cooled to 2° C., and anhydrous hydrogen chloride was sparged in until the temperature reached 10° C. A total of 17.4 grams (0.477 mol.) of hydrogen chloride was added. After the addition was complete, the reaction mixture was stirred at 2° C. to 10° C. for about two hours. The cooling bath was removed, and the reaction mixture allowed to warm to room temperature. The reaction mixture was stirred overnight during which time a white solid formed until the mixture was a thick slurry. The excess hydrogen chloride was sparged out with a stream of nitrogen. The solid was filtered off, washed with toluene, air dried, and vacuum dried to yield 57.7 grams (97% yield) of the title intermediate. The melting point was found to be 202°–204° C., however, the imidate salt rearranges on heating to form 2-naphthylacetamide.

Elemental analysis showed carbon 67.3%, hydrogen 6.70% and nitrogen 5.62% compared to theoretical values of carbon 67.3%, hydrogen 6.46%, and nitrogen 5.61%.

EXAMPLE 2

Preparation of N,N'-dimethyl 2-naphthaleneethanimidamide hydrochloride

In a 100 ml. reaction vessel, equipped with a stirrer, thermometer, a pressure-equalizing addition funnel, and a reflux condenser fitted with a drying tube, 11.95 grams (0.048 mol.) of ethyl 2-naphthaleneethanimidate hydrochloride was placed. A solution of 21.20 grams (0.683 mol.) of methylamine in 35 ml. of absolute ethanol was rapidly added to the reaction mixture. The temperature quickly rose to 65° C. and dropped to about 30° C. after all of the solution was added. The reaction mixture was kept between about 50°–53° C. for 21 hours. The reaction mixture was cooled to 2° C. and the white crystalline product was filtered off. The product was washed with toluene and dried to give 10.2 grams (85% yield) of the title compound. The crude product was recrystallized from absolute ethanol to yield 8.97 grams of the title compound. The melting point was 225.5°–227° C.

Other novel substituted imido ester salt intermediates corresponding to formula III were also prepared using the general procedure described in Example 1. These compounds are suitable for use in the process described above for the preparation of the corresponding N,N'-disubstituted 2-naphthaleneethanimidamide. The intermediates are as follows:

ethyl ester 1-chloro-2-naphthaleneethanimidate hydrochloride ethyl ester 6-methoxy-2-naphthaleneethanimidate hydrochloride ethyl ester 6-methyl-2-naphthaleneethanimidate hydrochloride ethyl ester 3-methyl-2-naphthaleneethanimidate hydrochloride ethyl ester 1-hydroxy-2-naphthaleneethanimidate hydrochloride ethyl ester 6-hydroxy-2-naphthaleneethanimidate hydrochloride Other intermediates corresponding to general formula III may be prepared in a similar manner.

We claim:

1. A compound of the general formula

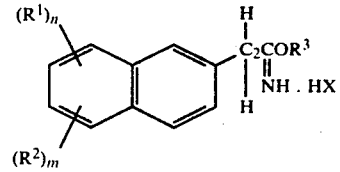

wherein $R^1$ and $R^2$ independently represent halo, a lower alkyl of from one to about three carbon atoms, or a lower alkoxy of from one to about three carbon atoms; m and n independently represent the integer 0 or 1; $R^3$ represents a lower alkyl of from one to about three carbon atoms; and X represents a halide.

2. The compound of claim 1 wherein n and m are both 0.

3. The compound of claim 1 wherein $R_1$ is in the 1, 3 or 4 position, n is 1, and m is 0.

4. The compound of claim 3 wherein $R_1$ is 1-chloro.

* * * * *

UNITED STATES PATENT AND TRADEMARK OFFICE
CERTIFICATE OF CORRECTION

PATENT NO. : 4,189,444
DATED : February 19, 1980
INVENTOR(S) : Albert Schuster, et al.

It is certified that error appears in the above-identified patent and that said Letters Patent are hereby corrected as shown below:

First page, under title ABSTRACT, first sentence, "N,N-) disubstituted" should read --N,N'-disubstituted--.

Column 1, line 43, "to 3" should read --to about 3--.

Column 1, line 64, "napohthaleneethanimidamide" should read --naphthaleneethanimidamide--.

Column 4, Claim 1, formula should read --

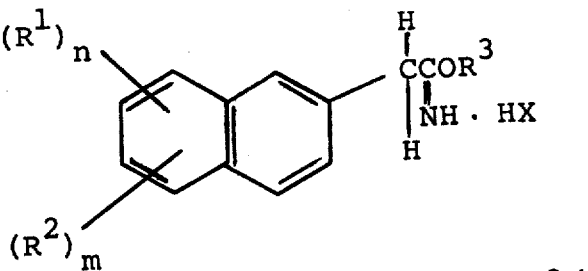

--.

Signed and Sealed this

Seventeenth Day of June 1980

[SEAL]

Attest:

SIDNEY A. DIAMOND

Attesting Officer

Commissioner of Patents and Trademarks